(No Model.)
2 Sheets—Sheet 1.
W. S. SALISBURY.
ELECTRIC MOTOR FOR STREET CARS.
No. 385,727. Patented July 10, 1888.
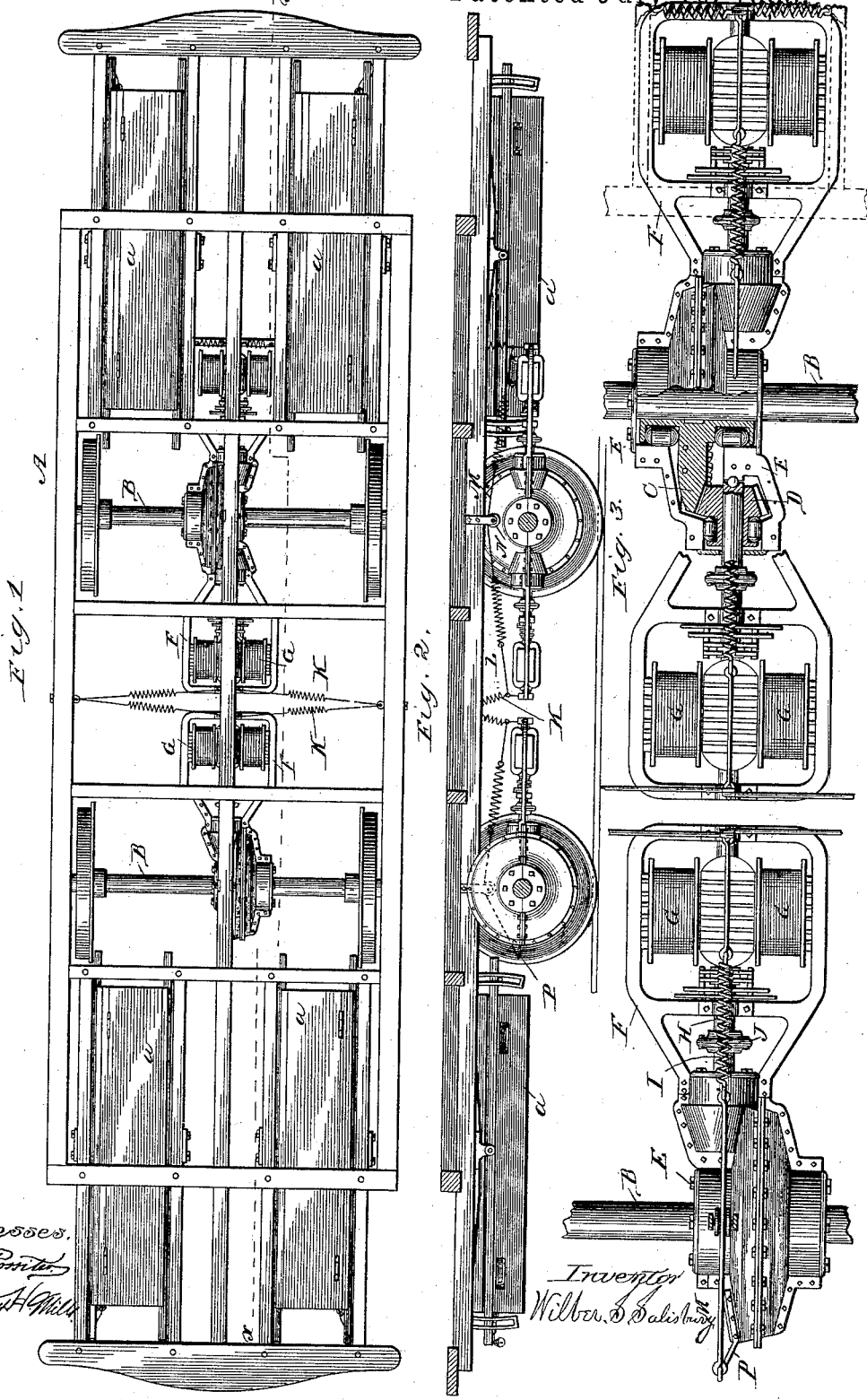

(No Model.) 2 Sheets—Sheet 2.
W. S. SALISBURY.
ELECTRIC MOTOR FOR STREET CARS.
No. 385,727. Patented July 10, 1888.
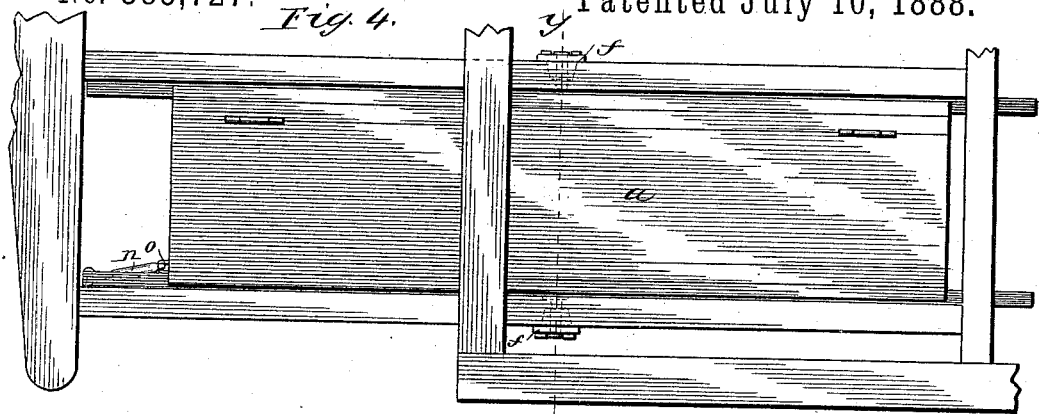
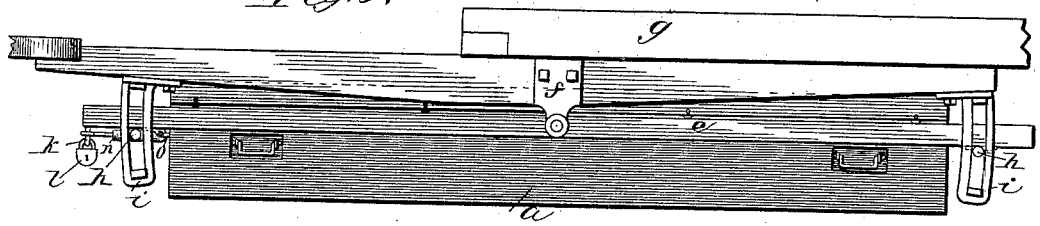
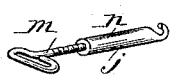
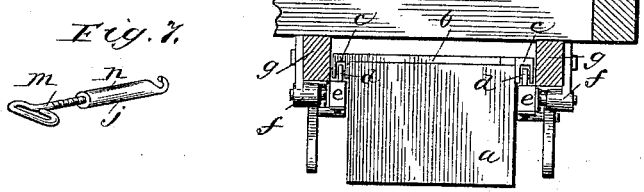
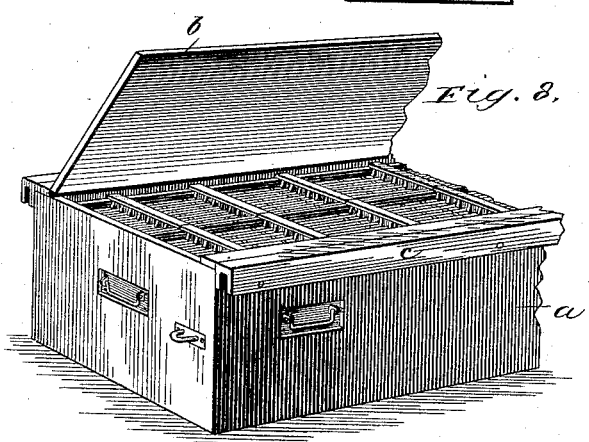
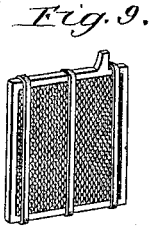
Witnesses.
W. Rossiter
Fredk H. Mills
Inventor.
Wilber S. Salisbury

UNITED STATES PATENT OFFICE.

WILBER S. SALISBURY, OF CHICAGO, ILLINOIS.

ELECTRIC MOTOR FOR STREET-CARS.

SPECIFICATION forming part of Letters Patent No. 385,727, dated July 10, 1888.

Application filed March 5, 1888. Serial No. 266,131. (No model.)

*To all whom it may concern:*

Be it known that I, WILBER S. SALISBURY, of Chicago, in the county of Cook and State of Illinois, have invented certain new and useful Improvements in Electric Motors for Street-Cars, of which the following is a specification.

This invention relates to improvements in electric motors for street-cars in which power is transmitted to the axles of the car from electric motors attached to the car by means of suitable gear-connections, which motors are charged or energized from batteries also carried upon the car.

Heretofore, so far as I am aware, the motors have been attached to or suspended from the body of the car or from a frame connecting the axles and forming part of the truck; but such construction has proven objectionable, because of the twisting and teetering of the car-frame relative to the truck or axles, and also the independent movements of the axles relative to each other, which results in the "choking" of the gears or breaking of the gear-teeth, thereby rendering the devices practically useless, and these dangers are greatly enhanced by the constant curves necessary in the construction of street-railways. The batteries, too, by which the motors are energized have heretofore been rigidly secured to the under side of the car-body or else within the same; but such a construction is also objectionable, because of the inaccessibility of the batteries, which must necessarily be frequently recharged, and in the use of secondary or storage batteries it is well known that the best results are only attainable by resting the battery after each use thereof and before recharging.

By reason of the manner heretofore employed of supporting the motors and transmitting their power to the axles the gear-connections have been necessarily exposed to the elements and to the lodgment thereon of dust, dirt, snow, and other foreign substances, all tending to reduce the durability of the connections and unnecessarily expose them to the danger of fracture as a result of the foregoing causes or from accidental means which would prove equally disastrous.

The prime object of this invention is to have electric motors supported upon and in gear-connection with the axles of a car, whereby the motors will be unaffected by the movements of the body of the car relative to the axles or of the axles relative to each other.

Another object is to so support the motors upon the axles that they shall be free to oscillate thereon without interference with the transmission of their power to said axles.

A further object is to have a flexible or yielding connection between the frame supporting the motors and the car-body, whereby the motors may be held in their operative positions, and, while connected with the body of the car, are free to move independent thereof and are unaffected by the movements of the said car-body.

A further object is to have the batteries for energizing the motors removably or detachably suspended from the body of the car, whereby the said batteries may be readily and quickly disconnected from the car for recharging or the substitution of another battery.

A further object is to so suspend the removable batteries from the car that while firmly held against an endwise movement they are free to oscillate independent of the movements of the car-body, and therefore remain at all times level, notwithstanding the continued change of position of said body, whereby the slopping over of the batteries in ascending or descending grades is avoided, and the durability of the batteries correspondingly promoted.

A further object is to provide a casing or covering for and which constitutes the bearing of the gear-connection between the motor and the axle, whereby the said connection is effectually protected from the action of the elements and the lodgments thereon of dirt, snow, and other foreign substances, all of which tend to reduce the durability of the parts and to render them more liable to fracture from binding and imperfect meshing of the teeth, and to combine with such casing a frame or frames for supporting the electric motors, whereby the said motors and their gear-connections with the shafts are held rigidly in their relative normal positions and said motors and their gears supported upon and oscillating on an axis common to the axle.

I attain these objects by the devices illustrated in the accompanying drawings, in which—

Figure 1 represents a plan view of a car-frame, showing devices applied thereto embodying my invention; Fig. 2, a vertical longitudinal section thereof on line $x$ $x$; Fig. 3, an enlarged detail plan view of the motors and their supporting-frames with parts broken away, showing the gear-connection of the motors with the axle; Fig. 4, an enlarged detail plan view of a portion of the car-frame, illustrating the manner of removably suspending the battery thereto; Fig. 5, a side elevation thereof; Fig. 6, a transverse section on the line $y$ $y$ of Fig. 4; Fig. 7, a detailed perspective of the adjustable locking-hook; Fig. 8, a detailed perspective of a portion of a secondary or storage battery preferably employed; Fig. 9, a detailed view of a battery-plate.

Similar letters of reference indicate the same parts in the several figures of the drawings.

Referring by letter to the accompanying drawings, A indicates the frame of a street-car, of any desired construction, and B the axles, having mounted thereon about the center of length thereof large gear-wheels C, with which mesh smaller beveled gear-wheels, D, journaled in a casing, E, also mounted upon the axle or hub of the gear-wheel C and cast in sections for convenience of putting together. This casing is journaled and supported upon the axles and entirely covers both the gear mounted upon the axle and the smaller gear journaled in the casing, and by the former the said casing is prevented from having a longitudinal movement upon the axle, all as clearly illustrated in the drawings. To this casing and to one or both sides thereof are secured the rectangular frames F, projecting therefrom on a horizontal plane, in each of which frames is mounted a small electric motor, G, of any well-known construction, the shaft H of which is coupled with the shaft I of the small gear-wheel D, or else has the said gear-wheel mounted thereon; but for convenience in detaching the motor for repairs or other reason the two shafts H and I are preferably united by the ordinary flange-couplings, J, bolted together and lying between the bearings of the gear and the motor-shaft.

To the motor-frames, at the ends thereof, are secured one end of opposing coiled springs K, lying transversely across the car-frame, the opposite ends of which springs are secured to the said frame near the sides thereof in such manner as to exert an opposing lateral strain upon said frames, which not only aids in supporting the frames in their operative position, but also tends to prevent their lateral swinging and consequent binding of the gears in turning curves or on irregular tracks. The main support of these frames, however, for maintaining them in their operative horizontal position are coiled springs L, secured at one end to the motor-frames, about the center of width thereof, and extending upwardly toward the center over the axle, where they are each secured to the ends of a bent or flexible metallic rod or short length of cable, M, which latter works over a pulley, N, journaled in a bracket, O, secured and depending from the car-frame. Hence it will be seen that, although the motor-frames are connected with the car-body by a yielding support, the connection is of such a character that the said frames, and consequently the motors, will be unaffected by the movements of the body of the car, and will therefore at all times remain in approximately a horizontal position, the yielding supports thereof being sufficiently strong to withstand the force of the gears in the operation of the car under all ordinary circumstances, but at the same time will yield sufficiently to prevent the breaking of the teeth of the gears in the case of an extra-heavy load, or if for any other reason the wheels should fail to promptly respond to the motors.

By the employment of the yielding support or flexible supporting guys or rods attached to the motor-frames and car-body the bed of the motors is relieved of all jarring consequent upon irregularity in the track and that which usually results from the rolling contact of two metallic surfaces, the rocking of said frames is equalized and centered, so as not to interfere with the transmission of the motive power, and the body of the car is free to have the usual teetering movements and depressions consequent upon variations of the load without in any manner affecting the operation of the motor, and a complete mechanical balance of the connection between the motors and the carrying or drive wheels of the car is secured.

Another important feature is that, without relinquishing any of the foregoing advantages, either one, two, three, or four motors to a car may be employed, to be used alternately or in unison; but two motors to an axle is preferred, as producing the best possible results, it being well known that two motors, each of the same horse-power as a single motor, are capable of exerting three or four times as many horse-power as the single motor, besides which they serve to balance each other upon the axle, and thereby relieve the yielding supports thereof of considerable wear; but if only one motor is desired to be connected with the axle, as shown in the drawings, the rod M at the end opposite the motor-frame will be attached to a bar, P, secured to and projecting from the gear-casing.

These motors are operated by suitable electric batteries, either chemical or storage, of any well-known and desirable construction suitable for the purpose intended—storage or secondary batteries being preferred because of their economy and greater convenience. These batteries are designed to be removably or detachably secured to the car-body, and to that end are placed in suitable boxes, $a$, having a hinged lid or cover, $b$, and provided at the upper side edges thereof with longitudinal bars $c$, in which are journaled anti-frictional rollers $d$, projecting on the under side of said bar. The box is designed to be suspended by means of these side bars between parallel pivoted bars or tracks $e$, upon which ride the anti-friction rollers in the side bars, the said tracks being pivoted about the center of length thereof to hangers rigidly secured to and depending from the usual timbers, g, of the car-frame. Secured to said tracks at each end thereof are laterally-projecting pins h, which work in segmentally-slotted plates i concentric with the axis of the pivots of said tracks for limiting the vertical movement thereof, and at the same time preventing a lateral swinging of said tracks.

In practice it is designed to slide the battery-box along on the tilting tracks until it exactly balances, and to then secure the box fixedly in its proper position by means of a hasp, j, and staple k, in connection with which an ordinary padlock, l, locking-pin, spring-key, or any other similar or suitable locking device may be employed, the hasp being adjustable in length by being formed in two parts—one a screw-threaded rod, m, and the other a screw-threaded sleeve, n, working upon said rod, and one of said members being provided with an eye for the reception of the staple k, while the other member has formed thereon a hook for engaging a staple, o, secured to the front end of the battery-box. The adjustability of this hasp is an important element in that it permits of the locking of the battery-box at various positions upon the tilting track supporting the same, so that the difference in the quantity of solution in the various cells of the battery will not in the least interfere with the balancing of the batteries on the track at all times.

The essential feature of such a connection as just described is that it renders the batteries readily removable or detachable from the car-body, and in practice the necessity for so securing the batteries to the car is well understood, especially in the use of secondary batteries, for it is well known that it is detrimental to their successful employment either to discharge them too completely or let them remain idle very long at a time; neither should they be charged or discharged rapidly enough to heat them above a gentle warmth, and the regularity with which they are used is greatly conducive to their durability, obviating all danger of warping of the plates or becoming otherwise deranged, which would require attention and involve expense. Hence it will be seen that batteries rigidly secured in position cannot be practically or satisfactorily employed in connection with electromotor devices for street-cars, in which they must obviously be called into almost constant use. While the essential feature of the construction described is the removably securing of the batteries to the car-body, another advantageous feature of such construction is the pivotal suspension of the batteries to the body of the car, so that while maintained against an endwise or longitudinal movement they are free to oscillate or swing upon their pivots independent of the movements of the car-body, and will therefore remain level at all times, notwithstanding the teetering of the car upon the tracks. Such construction is especially valuable where the car must run up and down grades, for by reason of the pivotal support the boxes will adjust themselves in ascending and descending grades, so as to avoid the slopping over and consequent injury of the batteries, as well as the boxes containing the same, thereby materially promoting the durability of the batteries.

The batteries and motors may be connected by any suitable system of wire-connection, and the operation of the motors may be controlled from either end of the car by switches or other similar devices in circuit therewith; but as the construction or operation of these devices or the particular manner of forming the electric circuit forms no part of this invention I have not deemed it necessary to herein illustrate or describe the same, they being well known in the art to which the invention appertains.

I am aware that prior to my invention battery-boxes have been removably secured to the body of the car by being placed inside the car underneath the seats, and also that a truck detachably connected to the car-body, and having battery-boxes secured rigidly thereto has heretofore been used; but both these devices are objectionable, because they involve either a remodeling of the cars in use or else a specially-constructed car. In the case of the former the body of the car must be varied six or eight inches, to clear the wheels, and it could not be used at all in the open or summer car, and even in the box-car a large and unsightly hole must be cut through the ends of the car and through the dash-boards in order to permit the removal of the batteries without ejecting all the passengers from the car. The latter method is obviously too expensive and cumbersome to embody practicability, it requiring the removal of the entire truck from the car-body in order to remove the batteries. I am not aware, however, that prior to my invention a battery-box has been ever suspended beneath the body of the car at the ends thereof and detachably secured thereto by a sliding connection in such manner as to render the same readily removable at any time, and which may be attached to the body of any car now in use without any change whatever in its construction, and which therefore removes all the objections to the prior construction and renders my device practical and economical to a maximum degree.

Having described my invention, what I claim, and desire to secure by Letters Patent, is—

1. In a motor for street-cars, the car-frame and the box for containing the battery, in combination with a longitudinal support attached to said frame at one end thereof for removably suspending said box below the frame, and a sliding anti-friction connection between said box and support, substantially as described.

2. In a motor for street-cars, the car-frame, a track, and a pivot-connection between said track and frame about the center of length of said track, in combination with a box for containing the battery supported upon and removably suspended below the frame by said track, substantially as described.

3. In a motor for street-cars, the car-frame, a track, and a central pivot-connection between said track and the frame, in combination with a box for containing the battery supported upon and removably suspended below the frame by said track, guide-plates, and a pin-and-slot connection between said plates and the track intermediate the center and ends thereof, substantially as described.

4. In a motor for street-cars, the car-frame, a track, and a central pivot-connection between said track and the frame, in combination with a box for containing the battery, and an anti-friction connection between said box and track, whereby said box is supported upon and removably suspended below the car-frame by said track, substantially as described.

5. In a motor for street-cars, the car-frame, a track, and a central pivot-connection between said track and frame, in combination with a box for containing the battery, a detachable anti-friction connection between said box and the track, and a lock device for securing said box relative to the track, substantially as described.

6. In a motor for street-cars, the car-frame, a track, and a central pivot-connection between said track and frame, in combination with a box for containing the battery, a detachable anti-friction connection between said box and the track, and an adjustable lock device for securing said box relative to the tracks, substantially as described.

7. In a motor for street-cars, the car-frame, the axle, and a casing loosely journaled and supported upon said axle, in combination with one or more frames secured to said casing, motors mounted in said frames, a gear-connection between the motors and axles, a pulley secured to the car-frame, and a flexible or yielding guy-rod secured at its ends to said frames and working over said pulley, substantially as described.

8. In a motor for street-cars, the car-frame, the axle, and a casing loosely journaled and supported upon said axle, in combination with one or more frames secured to said casing, motors mounted in said frames, a gear-connection between said motors and axle, a pulley secured to the car-frame, a flexible or yielding guy secured at its ends to said frame and working over said pulley, and the laterally-yielding opposing guys secured at their end, respectively, to said frames and the sides of the car-frame, substantially as described.

9. In a motor for street-cars, the axle and one or more frames loosely journaled and supported upon said axle, in combination with one or more motors mounted on said frames, a gear-connection between said motors and the axle, a pulley secured to the car-frame, and a flexible or yielding guy-rod secured at its ends to said frames and working over said pulley, substantially as described.

This specification signed and witnessed this 28th day of February, 1888.

WILBER S. SALISBURY.

Witnesses:
W. ROSSITER.
FREDK. H. MILLS.